United States Patent [19]

Oran

[11] Patent Number: 5,408,619
[45] Date of Patent: Apr. 18, 1995

[54] NAMING SERVICE DATABASE UPDATING TECHNIQUE

[75] Inventor: David R. Oran, Bloomington, Ind.

[73] Assignee: Digital Equipment Corporation, Maynard, Mass.

[21] Appl. No.: 79,701

[22] Filed: Jun. 17, 1993

Related U.S. Application Data

[63] Continuation of Ser. No. 93,882, Sep. 8, 1987, abandoned.

[51] Int. Cl.[6] ............................................. G06F 13/14
[52] U.S. Cl. .................................... 395/325; 364/260; 364/260.1; 364/284.4; 364/282.4; 364/DIG. 1
[58] Field of Search ......................... 395/275, 325, 600

[56] References Cited

U.S. PATENT DOCUMENTS

| | | | |
|---|---|---|---|
| 4,423,414 | 12/1983 | Bryant et al. | 340/825.07 |
| 4,558,413 | 12/1985 | Schmidt et al. | 364/200 |
| 4,644,468 | 2/1987 | Doster | 364/200 |
| 4,694,396 | 9/1987 | Weisshaar et al. | 364/200 |
| 4,710,870 | 12/1987 | Blackwell | 364/200 |
| 4,714,992 | 12/1987 | Gladney et al. | 364/200 |
| 4,714,995 | 12/1987 | Materna et al. | 364/200 |
| 4,747,130 | 5/1988 | Ho | 364/200 |
| 4,754,395 | 6/1988 | Weisshaar et al. | 364/200 |
| 4,769,772 | 9/1988 | Dwyer | 364/200 |
| 4,780,821 | 10/1988 | Crossley | 364/200 |
| 4,800,488 | 1/1989 | Agrawal | 364/200 |
| 4,819,159 | 4/1989 | Shipley | 364/200 |
| 4,825,354 | 4/1989 | Agrawal | 364/200 |
| 4,845,658 | 7/1989 | Gifford | 364/900 |
| 4,853,843 | 8/1989 | Ecklund | 364/200 |
| 4,881,166 | 11/1989 | Thompson | 364/200 |
| 4,914,571 | 4/1990 | Baratz | 364/200 |
| 4,925,311 | 5/1990 | Neches | 364/200 |
| 4,937,784 | 6/1990 | Masai | 364/900 |
| 5,047,918 | 9/1991 | Schwartz | 364/200 |

FOREIGN PATENT DOCUMENTS 1252903  4/1989  Canada .............................. 354/233

OTHER PUBLICATIONS

Grapevine: An Exercise In Distributed Computing pp. 260–274, Comm. of The ACM, Apr. 1982, vol. 25, No. 4.

Shroeder et al., "Experience with Grapevine: The Growth of a Distributed System", ACM Transactions on Computer Systems, vol. 2, No. 1, Feb. 1984, pp. 3–23.

Patent Cooperation Treaty International Search Report.

Mockapetris et al., "A Perspective on Name System Design", Proceedings IEEE Infocom 85, Mar. 26–28, 1985.

Peterson, "A Yellow–Pages Service for a Local–Area Network", Computer Communication Review (ACW Press; Proceedings of The ACM Sigcomm '87 Workshop) Aug. 11–13, 1987.

Fleisch, "Distributed System V IPC in Locus: A Design and Implementation Retrospective", Computer Communication Review (Sigcomm '86 Symp./Communications; Architectures & Protocols), Aug. 5–7, 1986.

Primary Examiner—Eric Coleman
Attorney, Agent, or Firm—Fish & Richardson

[57] ABSTRACT

A naming service for use in a network which includes a plurality of client nodes and server nodes interconnected by a communications link. Each of the client nodes includes a clerk for transmitting service request messages to initiate selected operations. At least one of said server nodes includes a nameserver which includes a transaction agent, a database which contains a plurality of entries each containing attributes relating to an object, such as the location of related entries in any other nameservers, an update transfer portion and a control portion. The transaction agent receives service request messages from the clerk. In response to a service request message received by the transaction agent from the client node's clerk, the control module enables the update transfer section to transfer database updates over said communications link.

9 Claims, 2 Drawing Sheets

NAMING SERVICE DATABASE UPDATING TECHNIQUE

This is a continuation of application Ser. No. 07/093,882, filed Sep. 8, 1987, now abandoned.

BACKGROUND OF THE INVENTION

1. Field of the Invention

The invention relates generally to the field of digital data processing systems and more specifically to networks for use in connection with distributed systems.

2. Description of the Prior Art

A digital data processing system, or computer, typically includes a processor, associated memory and input/output units enabling a user to load programs and data into the computer and obtain processed data therefrom. In the past, computers were expensive, and so to be cost effective had to support a number of users. More recently, however, the cost of computers, particularly the processors and memories, has decreased substantially, and so it is relatively cost effective to provide a computer to one or at most only a few users.

A benefit of providing only a single computer for a large number of users was that the users could easily share information. Thus, for example, if all persons working in a bookkeeping or accounting department use a single common computer, they may maintain common accounting and bookkeeping databases up to date, and when necessary accounting reports may be generated from those databases. However, if they use separate computers, the data is stored in separate databases, on each computer, and so generating accounting reports would be more difficult.

As a result, networks were developed to provide a distributed computer system, that is, a system which permits diverse computers to communicate and transfer data among them. In addition, the networks allow the sharing of expensive input/output devices, such as printers and mass storage devices, and input/output devices which may be rarely used, such as links to the public telecommunications network. In a network, each computer is a node which communicates with other nodes over one or several wires. In addition, nodes may be provided which store and manage databases or other data files on mass storage devices, or which manage printers or links to the public telecommunications network.

A problem arises with networks, however, since resources used in the network, such as programs and data files, the input/output devices and so forth, are typically stored in, or connected to, only some of the nodes. If clients on other nodes need to use such resources, they must be able to find them. In the past, each client node had to maintain a file identifying the location, within the network, of all resources which were available to the client. With a large network with many resources, this arrangement required substantial amounts of memory at each client node devoted only to the storage of such location information. In addition, maintaining location information in the diverse client nodes in an updated and current condition was difficult and required processing by the client node and transfers over the network which could otherwise be used for more useful information processing purposes.

More recently, naming services have been developed which maintained the identification of the locations of the resources available in a network. Naming services maintain the location information in only a few locations in the network, and provide the information to a client node on request. In addition, the naming services update the location information over the network without client node processing.

SUMMARY OF THE INVENTION

The invention provides a new and improved naming service for use in a network.

In brief summary, the new naming service includes a clerk in each of the client nodes for transmitting service request messages to initiate selected operations. At least one of said server nodes includes a nameserver which includes a transaction agent which receives service request messages from the clerk. A database contains a plurality of entries each containing attributes relating to an object, such as the location of related entries in any other nameservers, if any. An update transfer section connected to said communications link transfers database updates over said communications link under control of a control module in response to a service request message received by the transaction agent.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
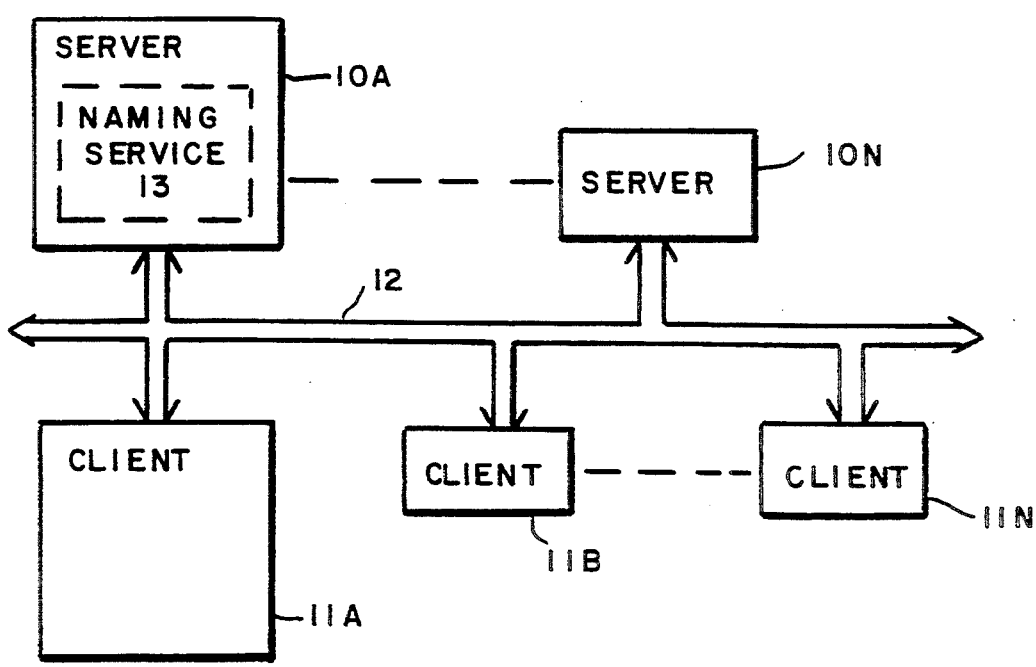
FIG. 1 is a general block diagram of a distributed digital data processing system constructed in accordance with the invention.

FIG. 1 is a general block diagram of a distributed digital data processing system constructed in accordance with the invention. With reference to FIG. 1, the system includes a plurality of nodes, including server nodes 10A through 10N (generally identified by reference numeral 10) and a plurality of client nodes 11A through 11N (generally identified by reference numeral 11) interconnected by a communications link 12. The server nodes 10 provide a number of services to client nodes 11. The client nodes 11 are used by users to perform or initiate data processing. Examples of services provided by server nodes 11 include printing and telecommunications services, data processing, mass storage backup of data which is processed by the client nodes 11 or by a server node 10, and common database control for client nodes 11, allowing a plurality of client nodes to access a common database. It will be appreciated that not all server nodes provide all of such services to the client nodes 10; in some cases, one or only a few server nodes 10 may provide a particular service to the client nodes 11. In addition, some of the server nodes 10 may provide multiple services to the client nodes 11.

At least one server node 10 in the system provides a naming service 13. In brief, a naming service provides from a single location, namely the server node containing the naming service, the location of any object in server nodes 10 and client nodes 11 which may be accessed by a client node 11. An object is typically a file, for example, a program or a data file, which is identified by a name, or a directory, which may contain a file or other directory, which is also identified by a name, or any other addressable resource in the system. A client node 11 which requires access to an object, provides the naming service 13 with the name of the object, and the naming service identifies the client node 11 or server node 10 which controls the object and through which the object can be accessed. Depending on the number of objects, client nodes 11 and server nodes 10, the naming service may be divided among several server nodes 10.

In particular, the naming service provides a database having a plurality of entries each associated with an object. Each server node 10 which serves to maintain portions of the naming service contains part, but not necessarily all, of a copy of the database; that is, portions of the database may be maintained on several of the server nodes 10 which form part of the database. Parts of the database may be replicated among the various server nodes 10.

The database entries contain attributes for each of the objects. In one embodiment, attributes include such information as the object identifier, an update timestamp, access rights to the object, and the network address of the object. If the object is a directory, the directory may reside at more than one location, and if so the directory will have a network address for each location. In addition, if an object is a directory, its entry may be replicated in several of the server nodes 10, and attributes associated with each directory entry identify the locations of the directory in the network, how up to date each location is, and a convergence attribute which specifies the degree of effort required to be expended to maintain the directory's replicas up to date. An entry for a directory also identifies its relationship with other directories, in a system which maintains tree-structured directories.

Figure 2:
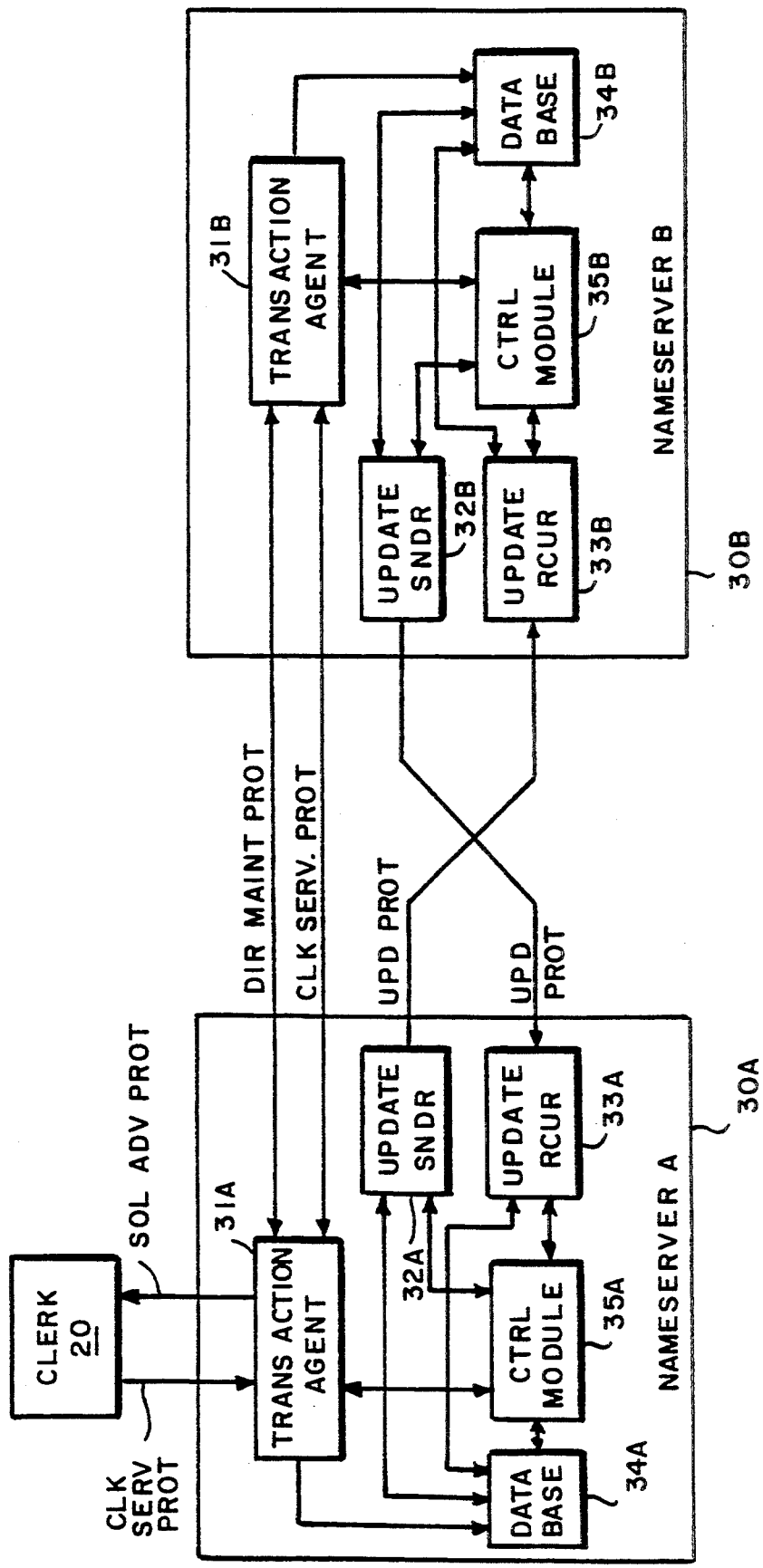
FIG. 2 is another block diagram useful in understanding the invention.

FIG. 2 depicts a block diagram of modules in the naming service in the system depicted in FIG. 1. The naming service includes a clerk 20, which actually resides in all of the client nodes 11, and one or more nameservers generally identified by reference numeral 30, with each nameserver 30 residing in a server node 10. The clerk 20 provides the client interface to enable a client node 11 to communicate with the nameservers 30 in the various server nodes 10.

The nameservers 30 are all similar and so one nameserver, namely nameserver 30A, will be described in detail. Nameserver 30A includes a transaction agent module 31A which communicates with the clerks 20, an update sender module 32A and an update receiver module 33A, which respectively communicate to other nameservers 30 changes to a database 34A and receive from other nameservers 30 and enter changes for the database 34. Database 34 is the portion of the name service database resident on the particular nameserver. A control module 35A controls accesses to the database, and the operation of the transaction agent 31A, update sender 32A and update receiver 33A.

More specifically, periodically the transaction agent 31 in the nameserver 30 in each of the server nodes 10 which forms part of the naming service broadcasts over the communications link 12 a solicitation advertising message, using a SOL ADV PROT solicitation advertising protocol, notifying the clerks 20 in all of the client nodes 11 of their existence. When the client node 11 requires service from a nameserver, it transmits, using a CLK SERV PROT clerk server protocol, a service request. A client node 11 may require service for several reasons. For example, the client node may need to access an object or obtain information about an object, such as the various subdirectories of a directory. Alternatively, a client node 11 may need to create an object, particularly a directory or a file, delete an object, or modify various attributes, such as access rights, with respect to an object. In addition, a client node may require a directory to be backed up. To initiate these services, the client node 11, through its clerk, transmits a service request to a transaction agent 31 about which it previously learned from the transaction agent's prior solicitation advertising message.

The transaction agent 31 receives the service request from the clerk and communicates with its control module to determine whether the nameserver 30 is the proper one to service the request. The control module 35 must first determine, from the records in data base 34, whether it maintains entries relating to the object, if it is to be deleted, backed up or accessed, or if it maintains the directory in which the object is to be created if a new object is to be created. If it does, it may accept the service request. If it does not, the control module 35 enables the transaction agent 31 to either refuse the service request or to transmit the service request to another nameserver 30, also using the CLK SERV PROT in communication with the transaction agent 31 of the other nameserver 30.

If the service request can be performed by a nameserver 30, the control module 35 enables operations which depend on the particular service request. For example, if the service request requires creation of an object, the control module 35 creates a new entry in the database 34 for the object and enters the various attributes. If an object is created in a directory, the control module at some point enables transaction agent 31 to update entries relating to the directory in databases 34 in other nameservers 30 to reflect creation of the object in the directory using a DIR MAIN PROT directory maintenance protocol. The transaction agent 31 uses the attributes in the object's entry in the database 34 identifying other nameservers 30 whose databases 34 contain entries for the object in this operation.

Similarly, if the service request requires deletion of an object, the control module 34 enables the deletion of the object from the database 34 and enables the transaction agent 31 to update the databases 34 in other nameservers 30 to reflect deletion of the object. In this operation, the transaction agent also uses the DIRMAIN PROT directory maintenance protocol in enabling the operation and the attributes in the database 34 identifying other nameservers 30 whose databases contain entries for the object.

In performing an update, whether in response to a service request from a clerk 20 requiring creation or deletion of an entry or in response to a service request from a clerk 20 requiring transmission of updates to other nameservers, the transaction agent 31 uses the update sender module 32. The transaction agent 31, using the DIR MAIN PROT directory maintenance protocol, verifies other nameservers 30 whose databases 34 maintain entries associated with directories which require updating. For entries for other objects, and to perform the actual updating of entries relating to the directories, the update sender module 32 and update receiver modules 33 of identified nameservers 30 transfer update information using an UPD PROT update protocol.

If a service request from a clerk 20 requires a return of information, such as the location of an identified object, if the nameserver 30 receiving the request can service the request, the transaction agent 31 returns the requested information to the clerk 20 using the CLK SERV PROT clerk service protocol. The information returned may include, for example, only the location information, or it may include all attributes relating to an entry, the identification of subdirectories of a directory, or whether an attribute in an entry has a value specified in the service request.

In addition to transmitting updates to other nameservers 30 in response to a service request therefor from a clerk 20 in a client node 11, the control module 35 in each nameserver 30 also initiates transmission of updates periodically. If a nameserver 30 is unable to accept an update operation, for example, if its server node 10 is busy or not operational at the time, the nameserver 30 which initiated the update will retry as specified in the convergence attribute for the entry and the relationship between the attribute specifying the date of the last update and the attribute identifying how up to date entries for the directory are to be.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A naming service for use in a plurality of client nodes and a plurality of server nodes interconnected by a communications link, said naming service comprising:
   A. a database of entries each containing information needed for responding to name service requests from said client nodes;
   B. a clerk means in each of said client nodes for transmitting service request messages to initiate selected operations, said service request messages including database update request messages for causing entries of said database to be updated;
   C. a name server means in each of at least two of said server nodes, each of said name server means including:
      i. transaction agent means for receiving said service request messages from said clerk means;
      ii. database means containing at least a portion but not all of said database entries;
      iii. update means for updating said entries in response to said database update request messages if said database means contains the entries to be updated;
      iv. update transfer means connected to said communications link for transferring database update requests and database updates over said communications link from said name server means in one server node to other server nodes containing name server means, regardless of whether the database means in the one server node contains the entries to be updated; and
      v. control means connected to said transaction agent means, said database means, and said update transfer means for enabling said update transfer means and said database means to engage in an update operation cooperatively with another server node containing name server means in response to a database update request message received by said transaction agent means.

2. A naming service method for use with client nodes and server nodes interconnected by a communications link, said naming service method comprising:
   A. storing in a database means entries containing information needed for responding to name service request messages from said client nodes;
   B. transmitting service request messages from said client nodes to initiate selected operations, said service request messages including database update request messages for causing entries of said database means to be updated;
   C. in each of two of said server nodes:
      i. receiving some of said service request messages through a transaction agent means at one of said server nodes;
      ii. storing in said database means at said one server node a portion but not all of said database entries;
      iii. updating at least some of said entries in response to said database update request messages if said one server node contains the entries to be updated;
      iv. transferring said database update request messages and database updates over said communications link from said one server node to another server node, regardless of whether said one server node contains entries to be updated; and
      v. engaging in an update operation cooperatively with said other server node in response to said database update request message.

3. The method of claim 2 wherein said database means includes entries for a directory residing at more than one location in a network, and the directory has a network address for each location at which the directory resides.

4. The method of claim 3 wherein each of said entries for a directory is replicated at multiple server nodes.

5. The method of claim 3 wherein each of said entries for a directory includes an attribute specifying the degree of effort required to maintain the directory's replicas up to date.

6. The method of claim 3 wherein each of said entries for a directory includes attributes identifying the relationship, in a tree structure, of that directory with other directories.

7. The method of claim 3 wherein each of said entries for a directory includes attributes identifying the locations of the directory in the network.

8. The method of claim 7 wherein
   when a directory in said database means on a server node is updated by addition or deletion of an object, entries relating to the directory in database means in other of said server nodes are updated using attributes identifying other server nodes whose database means contain entries for the object.

9. The method of claim 7 wherein
   if one of said server nodes is unable to accept an update service request for an entry for a directory, the server node which initiated the update service request will retry as specified in a convergence attribute for said entry and the relationship between an attribute specifying the data of the last update and an attribute identifying how up-to-date entries for the directory are to be.

* * * * *

UNITED STATES PATENT AND TRADEMARK OFFICE
CERTIFICATE OF CORRECTION

PATENT NO. : 5,408,619

DATED : April 18, 1995

INVENTOR(S) : David R. Oran

It is certified that error appears in the above-identified patent and that said Letters Patent is hereby corrected as shown below:

Col. 4, line 46, "DIRMAIN" should be --DIR MAIN--.

Signed and Sealed this

Twenty-fourth Day of September, 1996

*Attest:*

BRUCE LEHMAN

*Attesting Officer*  *Commissioner of Patents and Trademarks*